(12) United States Patent
Ciochon et al.

(10) Patent No.: US 12,145,851 B2
(45) Date of Patent: Nov. 19, 2024

(54) METHOD OF OBTAINING A SILICON CARBIDE-GRAPHENE COMPOSITE WITH A CONTROLLED SURFACE MORPHOLOGY

(71) Applicant: UNIWERSYTET JAGIELLONSKI, Cracow (PL)

(72) Inventors: Piotr Ciochon, Cracow (PL); Jacek Kolodziej, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 233 days.

(21) Appl. No.: 17/640,397

(22) PCT Filed: Sep. 23, 2020

(86) PCT No.: PCT/PL2020/050068
§ 371 (c)(1),
(2) Date: Mar. 4, 2022

(87) PCT Pub. No.: WO2021/060999
PCT Pub. Date: Apr. 1, 2021

(65) Prior Publication Data
US 2022/0371900 A1    Nov. 24, 2022

(30) Foreign Application Priority Data

Sep. 23, 2019   (PL) .......................................... 431248

(51) Int. Cl.
*C23C 14/22* (2006.01)
*C01B 32/956* (2017.01)
*C01B 32/984* (2017.01)

(52) U.S. Cl.
CPC .......... *C01B 32/956* (2017.08); *C01B 32/984* (2017.08)

(58) Field of Classification Search
CPC ... C23C 14/221; C23C 14/02; C23C 14/0605; C23C 14/58
See application file for complete search history.

(56) References Cited

U.S. PATENT DOCUMENTS

| | | | | |
|---|---|---|---|---|
| 2010/0255984 A1* | 10/2010 | Sutter | .................. | H01J 3/14 |
| | | | | 252/502 |
| 2012/0258587 A1* | 10/2012 | Kub | ................... | H01L 21/0332 |
| | | | | 427/523 |
| 2013/0099195 A1* | 4/2013 | Seacrist | ................ | H01L 29/167 |
| | | | | 977/734 |
| 2015/0183189 A1* | 7/2015 | Kim | ...................... | C01B 32/184 |
| | | | | 156/308.6 |
| 2015/0246851 A1* | 9/2015 | Miranzo | ................ | B82Y 30/00 |
| | | | | 252/504 |
| 2016/0060123 A1* | 3/2016 | Rashidi | ................. | C01B 32/184 |
| | | | | 585/16 |
| 2016/0190446 A1* | 6/2016 | Schulze | ............. | H01L 29/0676 |
| | | | | 438/478 |
| 2016/0268128 A1* | 9/2016 | Cheng | ................. | H01L 21/0254 |
| 2016/0307756 A1* | 10/2016 | Fujii | ....................... | H01L 29/45 |
| 2018/0247772 A1 | 8/2018 | Mohsin et al. | | |
| 2018/0315599 A1* | 11/2018 | Berry | ................. | H01L 21/02491 |
| 2019/0226115 A1* | 7/2019 | Ciochon | ............ | H01L 29/1606 |

FOREIGN PATENT DOCUMENTS

PL         417804 A1 *  1/2018  .......... C01B 32/188

OTHER PUBLICATIONS

Ciochon, Piotr, et al., "Si Beam-assisted graphitization of SiC (0001)". Applied Physics A (2018) 124:727, pp. 1-9.*
Shtepliuk, Ivan, et al., "Combining graphene with silicon carbide: synthesis and properties—a review". Semiconductor Science and Technology, 2016. 31 pp. 1-56.*
Shengurov, V.G., et al., "A Silicon Sublimation Source for Molecular-Beam Epitaxy". Instruments and Experimental Techniques, 2016, vol. 59, No. 3, pp. 466-469.*
Kuznetsov, V.P., et al., "Sublimation Molecular Beam Epitaxy of Silicon-Based Structures"., Semiconductors, 2010, vol. 44, No. 3, pp. 396-400.*
Antonelou, Aspasia, et al., "Laser processing of SiC: From graphene-coated SiC particles to 3D graphene froths". Carbon 85 (2015) 176-184.*
Kruskopf et al., Comeback of epitaxial graphene for electronics: large-area growth of bilayer-free graphene on SiC, 2D Materials, vol. 3, No. 4, p. 041002 (2016).

* cited by examiner

*Primary Examiner* — Bret P Chen
(74) *Attorney, Agent, or Firm* — Arrigo, Lee, Guttman & Mouta-Bellum LLP (57) ABSTRACT

A method of obtaining a SiC-graphene composite with a controlled surface morphology having a surface covered with terraces or a network of pits where the method comprises providing a SiC substrate, annealing in an external beam of silicon atoms, and then cooling in an external beam of silicon atoms is disclosed.

7 Claims, 12 Drawing Sheets

METHOD OF OBTAINING A SILICON CARBIDE-GRAPHENE COMPOSITE WITH A CONTROLLED SURFACE MORPHOLOGY

The object of the invention is a method of obtaining a composite containing silicon carbide and graphene in the surface layer with simultaneous control of its morphology during the graphitization process. The invention is used in the processes of surface preparation of graphene on silicon carbide, where the degree of surface smoothness is important from the point of view of applications, e.g. in applications in the field of electronics or electrical energy storage.

The smoothness of the SiC surface, especially covered with a graphene layer, is one of the key parameters determining its applicability in various branches of the economy. Conductive surfaces with a high degree of roughness (high coverage with pits/pores) can be used, for example, as electrodes in energy storage devices, e.g. supercapacitors (*A thin film approach for SiC-derived graphene as an on-chip electrode for supercapacitors, Nanotechnology.* 2015 Oct. 30; 26(43):434005), due to the combination of their high conductivity and high specific surface area. Graphene-coated surfaces with a high degree of smoothness can be used in electronics, optoelectronics and spintronics (*Comeback of epitaxial graphene for electronics: large-area growth of bilayer-free graphene on SiC, Mattias Kruskopf et al* 2016 *2D Mater.* 3 041002). From the point of view of these applications, the height of surface terraces is also extremely important. The methods used lead to the formation of terraces with a height of dozen or several dozen nanometers on the treated SiC surface (*Towards wafer-size graphene layers by atmospheric pressure graphitization of silicon carbide, Nature Materials* volume 8, pages 203-207 (2009)), in the mechanism of the so-called step bunching, which negatively affects the parameters of electronic devices based on graphene produced on the SiC surface. Moreover, the production of high terraces makes their parameters anisotropic, i.e. they depend on the direction on the surface (the conductivity of the surface or the mobility of electric carriers is much lower in the direction perpendicular to the direction of the terraces, due to the high barrier they have to overcome in this direction), also due to the fact that the graphene produced at the border of the terraces is thicker than the graphene covering their surface.

A method of obtaining porous carbon for use as an electrode material in a lithium-sulfur battery is known from the US patent application US2014045072A1. The method includes: providing a matrix consisting of an inorganic material that contains spherical nanoparticles and pores, infiltrating the matrix pores with a first carbon precursor, carbonizing so as to form an inner layer on the nanoparticles with a first microporosity, infiltrating the remaining matrix pores with a second carbon precursor substance, carbonizing the precursor substance, wherein an outer layer having a second microporosity that is lower than the first microporosity is formed on the inner layer, and removing the template to form a carbon product with a layered composite structure, having an inner layer consisting of fibrous carbon having a relatively high microporosity which has a free surface facing the pit, and an outer layer consisting of carbon with a second, relatively low microporosity, which has a free surface facing the pit.

PCT application WO18111433A1 discloses a method of pore formation in thin atomic layers. It describes the process of obtaining porous graphene on a copper substrate containing traces of CuOx, which are introduced on the surface of the substrate by annealing at a temperature of 200° C.-1000° C. before deposition of graphene. They prevent the build-up of graphene in the regions they occupy, thus creating nanopores. Graphene is deposited in the CVD (Chemical Vapor Deposition) process. Additionally, the surface is etched during or after the CVD process.

A method of synthesizing high-quality graphene on the surface of silicon carbide (0001) by surface graphitization of the compound in a beam of silicon atoms from an external sublimation source is known from the Polish patent description P. 417804. The production process is carried out at a pressure below $1\times10^{-9}$ mbar, annealing at a temperature of 300° C. to 1050° C. with a beam of silicon atoms from an external sublimation source, and in the last stage it is annealed at a temperature of 1300° C. to 1800° C., at a pressure of no more than $5\times10^{-7}$ mbar, in a beam of silicon atoms from an external sublimation source providing a nominal silicon growth rate of 0.5 Å/min to 10 Å/min.

The problem to be solved by the invention is to provide a method of obtaining graphene, which in one process would provide the possibility of producing graphene on the surface of the substrate, control the morphology of the surface of the graphene layer, and would be possible to carry out using standard techniques without the need for additional operations or special preparation, physical or chemical, of the surface of the substrate, while the surface morphology control would be possible regardless of the arrangement of the graphene layers. Unexpectedly, the above problems were solved by the present invention.

The first object of the invention is a method of obtaining a carbide-graphene surface composite with a controlled surface morphology, especially a SiC-graphene composite, characterized in that the SiC substrate, especially with a crystalline or polycrystalline structure, after initial preparation is successively subjected to:
 (a) annealing at a temperature of 1573 K to 2090 K, at a pressure of not more than $5\times10^{-7}$ mbar, in the first beam of silicon atoms from an external source of silicon atoms,
 (b) cooling,
  wherein in step (b) the SiC crystal from step a) is cooled at a rate of 0.23 K/s to 1.43 K/s, in the second beam of silicon atoms from the external source of silicon atoms, to obtain a surface covered with low terraces, or cooled at a rate of >100 K/s in the third beam of silicon atoms from the external source of silicon atoms, to obtain a surface covered with a network of pits.

Preferably, the first beam of silicon atoms from the external source of silicon atoms during cooling ranges from $7.0\times10^{13}$ $cm^2s^{-1}$ to $2.5\times10^{14}$ $cm^2s^{-1}$.

The beam of silicon expressed in $cm^2s^{-1}$ should be understood as the beam density of silicon atoms. It can be measured by any known method, for example indirectly—by measuring the growth rate of silicon on a quartz balance and conversion to the beam density.

In a further preferred embodiment of the invention, the second beam of silicon atoms from the external source of silicon atoms during the annealing ranges from $7.0\times10^{13}$ $cm^2s^{-1}$ to $2.5\times10^{14}$ $cm^2s^{-1}$.

In a further preferred embodiment of the invention, the third beam of silicon atoms from the external source of silicon atoms during cooling ranges from $5.0\times10^{13}$ $cm^2s^{-1}$ do $2.5\times10^{14}$ $cm^2s^{-1}$.

In another preferred embodiment of the invention, the external source of silicon atoms is a sublimation source. By sublimation source it is meant a source in which the emission of silicon atoms occurs through sublimation from a heated solid—e.g. silicon filament.

The second object of the invention is a carbide-graphene composite on a SiC surface, with a crystalline or polycrystalline structure, obtained by the method as defined in the first object of the invention, containing from one to four atomic layers of graphene forming a honeycomb lattice, wherein their diffraction spectrum obtained by the low energy electron diffraction method has a diffraction pattern typical of graphene on the SiC surface, characterized by that it contains a surface covered with terraces or a network of pits, wherein the difference in height of the terraces is from $0.25 \times 10^{-9}$ m to $2.5 \times 10^{-9}$ m or the pits surface density is at least $5 \times 10^{12}/m^2$.

In a preferred embodiment of the invention, the depth of the pits is not more than $3.0 \times 10^{-9}$ m.

In a further preferred embodiment of the invention, the graphene contains ABC-stacked graphene layers.

In a further preferred embodiment of the invention, the carbide-graphene composite comprises from 2 to 4 layers of graphene.

Samples for which the cooling rate v is high (v>100 K/s) are characterized by a higher degree of surface coverage with pits and a greater surface coverage with graphene compared to samples for which a low cooling rate was used (0.23 K/s<v<1.43 K/s). Thus, the process enables the production of a carbide-graphene surface composite with controlled morphology and composition. Depending on the needs, it is possible to obtain a surface with a very high degree of coverage with pits (surface density of pits), or a surface completely devoid of pits, almost perfectly smooth, covered with terraces with a low difference in the height of adjacent terraces. The surface can be covered with a controlled number of graphene layers.

The technique of atomic force microscopy (AFM) was used to assess the degree of smoothness of the SiC surface annealed under changing conditions (temperature, silicon beam density) and with the use of a variable cooling rate, while the angle-resolved photoelectron spectroscopy (ARPES) was used to assess the degree of surface coverage with graphene.

The invention has several advantages. Thanks to its use, it is possible to obtain a graphene-carbide composite, ensuring the control of the surface morphology (low terraces or high surface coverage with pits), which is important due to the potential applications and the versatility of the method and the possibility of its use in various fields of the economy. Due to the high purity of the environment (surroundings of the graphitized SiC), it is possible to heat the surface for a long time without increased exposure to contaminations. For beam equivalent pressure (BEP) of approx. $10^{-5}$ Pa, the BEP value for pollutants is in the worst case $10^{-9}$ Pa, i.e. up to 5 orders of magnitude less than in the case of the frequently used method utilizing graphitization in atmospheric pressure of buffer gases. In addition, in the described method, there is no need to use additional equipment, processes or technological treatments, which affects the economics of the process. The use of the solution according to the invention also does not require special surface preparation of the substrate in a separate process. This process can be easily scaled by increasing the size of the silicon carbide sample annealed at the same time, it is fully compatible with existing ultra-high vacuum systems, and easy to implement, as it requires only a heating element to be integrated with the existing system, ensuring the ability to control the cooling rate, and the source of silicon atoms deposited on the surface. The process does not use harmful chemicals, therefore it is not necessary to work in a chemical laboratory, and it is also environmentally friendly. In addition, thanks to the ABC-type arrangement of graphene layers (ABC-stacking), this material is technologically important in terms of applications as a superconducting material, or to create an appropriate forbidden gap in the material.

Embodiments of the invention are illustrated in the Figures, where.

EXAMPLE 1

Preparation of Graphene on a SiC Surface with a Cooling Rate of 0.45 K/s (Sample 1 18.7.c)

Figure 1A:
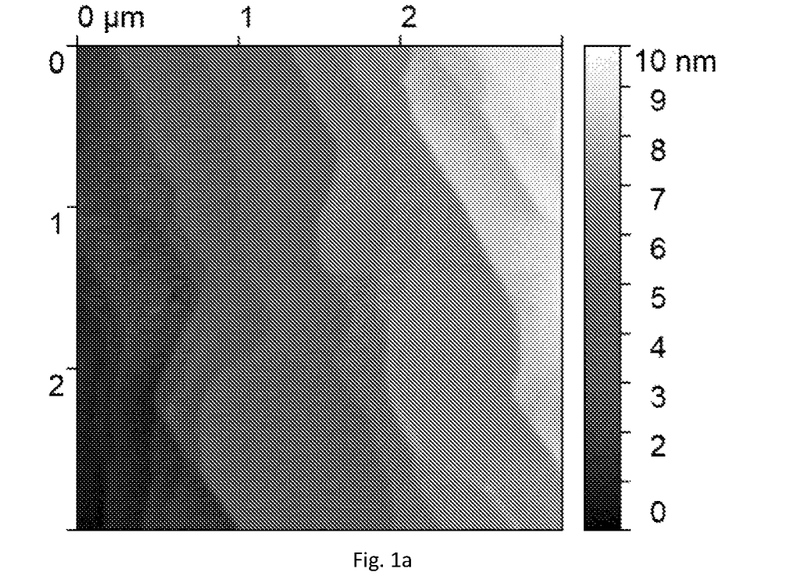
FIG. 1a-1b is an image of the SiC surface with a graphene layer for a cooling speed of 0.45 K/s.
Figure 1B:
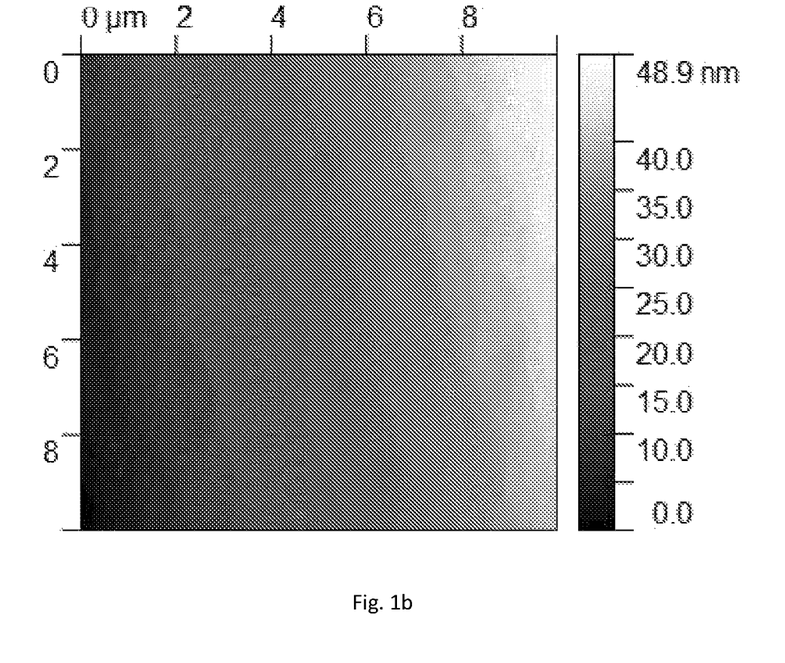
Figure 8:
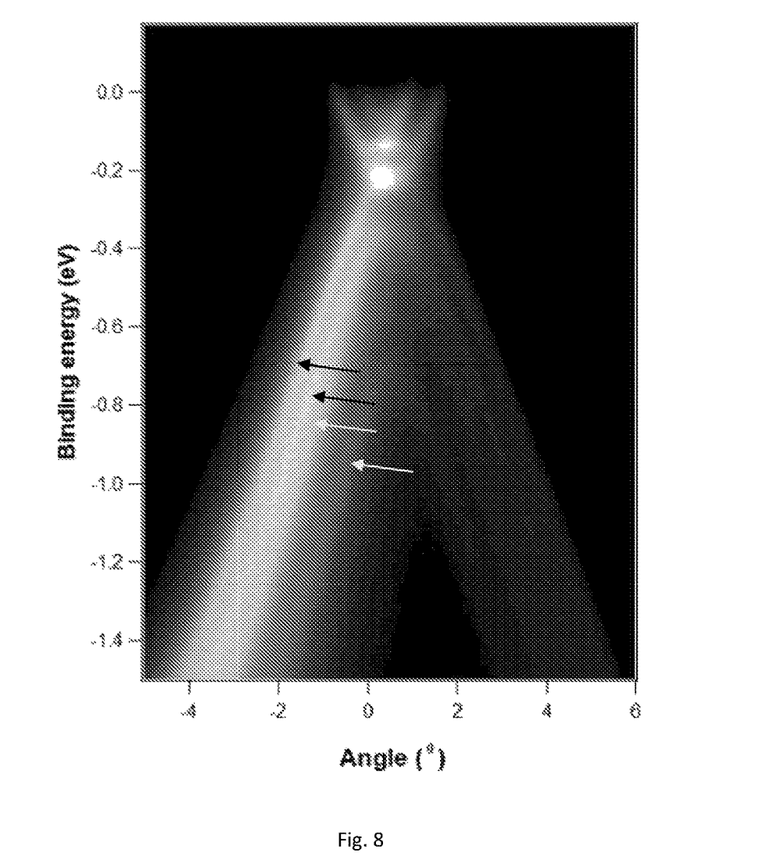
FIG. 8 is an ARPES spectrum of a SiC surface covered with four-layer graphene.

The SiC crystal with the (0001) orientation is introduced into the vacuum chamber, then the chamber is pumped down to a pressure of <$1 \times 10^{-9}$ mbar and the sample is annealed at a temperature gradually increasing from 373 K to 1123 K (degassing) and then the samples are annealed at a temperature of 1223 K under vacuum conditions in silicon atoms beam of a value of $6.0 \times 10^{12}$ cm$^2$s$^{-1}$. This ensures a silicon growth rate of 1 Å/min. Then the surface prepared in this way is subjected to the graphitization process at the temperature of 2024 K in a beam of silicon atoms from an external sublimation source corresponding to the nominal growth rate of silicon layers of 30 Å/min, which corresponds to a silicon beam of $1.8 \times 10^{14}$ cm$^2$s$^{-1}$ at a pressure in the vacuum chamber not exceeding $5 \times 10^{-7}$ mbar. After completion of the graphitization step, the sample is cooled down at the rate of 0.45 K/s in a beam of silicon atoms of $1.8 \times 10^{14}$ cm$^2$s$^{-1}$. FIG. 8 shows the spectrum obtained by the angle-resolved photoelectron spectroscopy (ARPES) technique, confirming the presence of four-layer graphene on the SiC surface (Dirac cone-shaped spectrum). The number of layers is equal to the number of dispersion relations visible in the spectrum (marked with arrows). The spectrum is characteristic for the four-layer ABC-stacked graphene, which is especially visible for the part of the spectrum located close to the Fermi energy, which is shown in FIG. 8. The surface image of the sample obtained in this way is shown in FIG. 1a. 1b. The samples cooled at a very slow rate (in this case 0.45 K/s) are characterized by an ordered, almost perfectly flat surface with a well-developed structure of low terraces.

EXAMPLE 2

Preparation of Graphene on a SiC Surface with a Cooling Rate of 0.45 K/s (Sample 2)

Figure 2A:
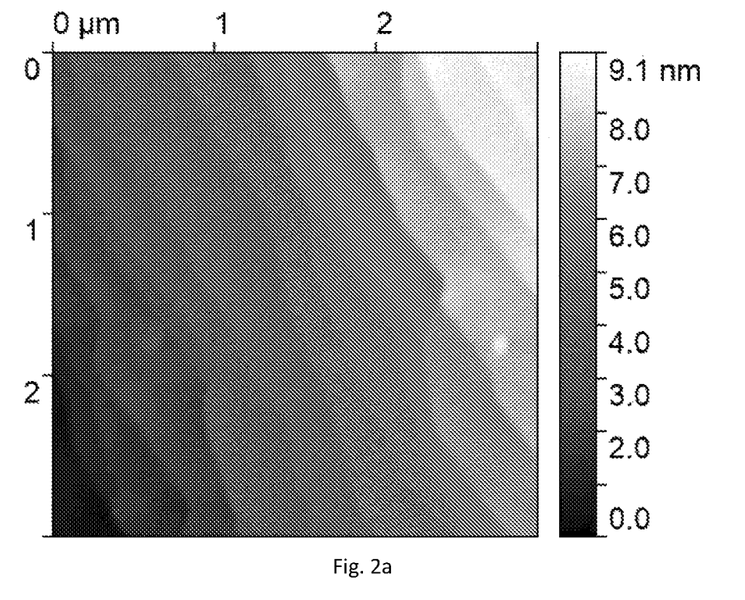
FIG. 2a-2b is an image of a SiC surface with a graphene layer for a cooling speed of 0.45 K/s.
Figure 2B:
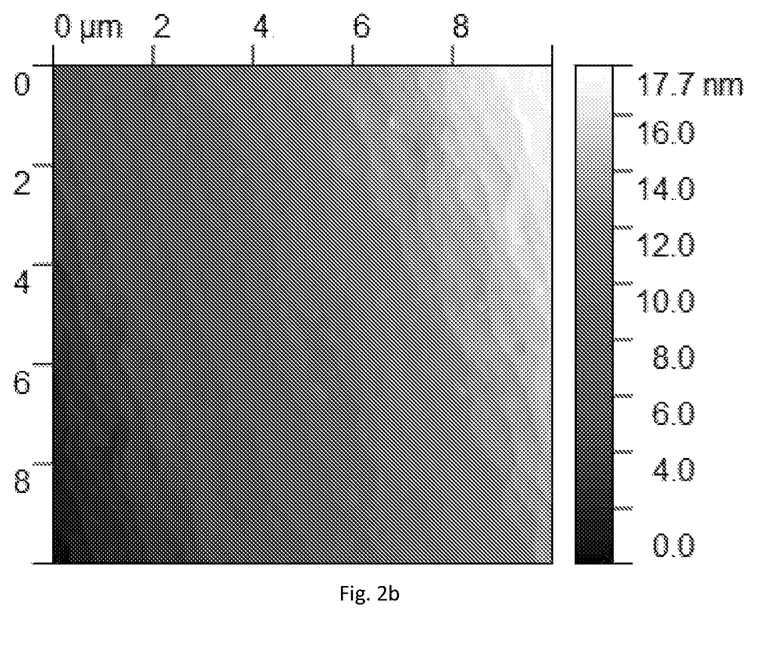
Figure 9:
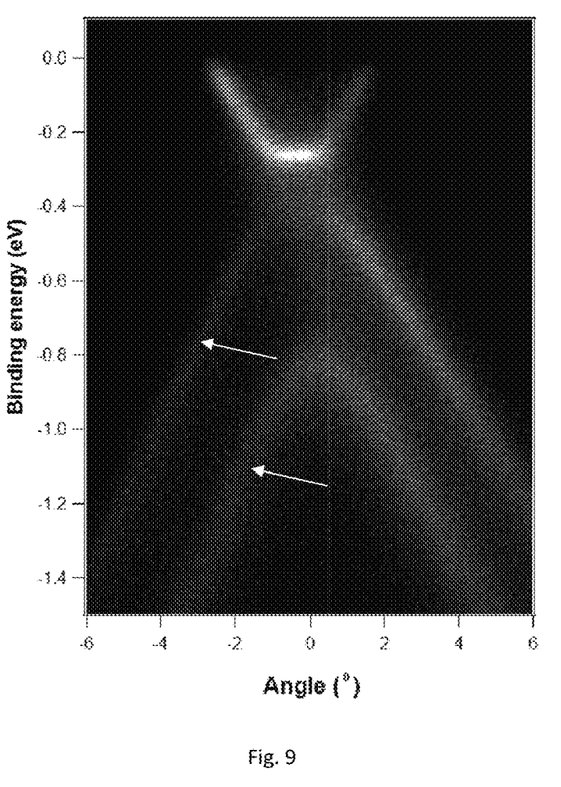
FIG. 9 is an ARPES spectrum of SiC surface covered with two-layer graphene.

The preparation of graphene on the SiC surface is carried out according to example 1, with the difference that the graphitization step is carried out at the temperature of 1973K. The surface image of the thus obtained sample is shown in FIGS. 2a-2b. FIG. 9 shows the spectrum obtained by the angle-resolved photoelectron spectroscopy (ARPES) technique, confirming the presence of two-layer graphene on the SiC surface.

EXAMPLE 3

Preparation of Graphene on a SiC Surface with a Cooling Rate of 0.45 K/s (Sample 3)

Figure 3:
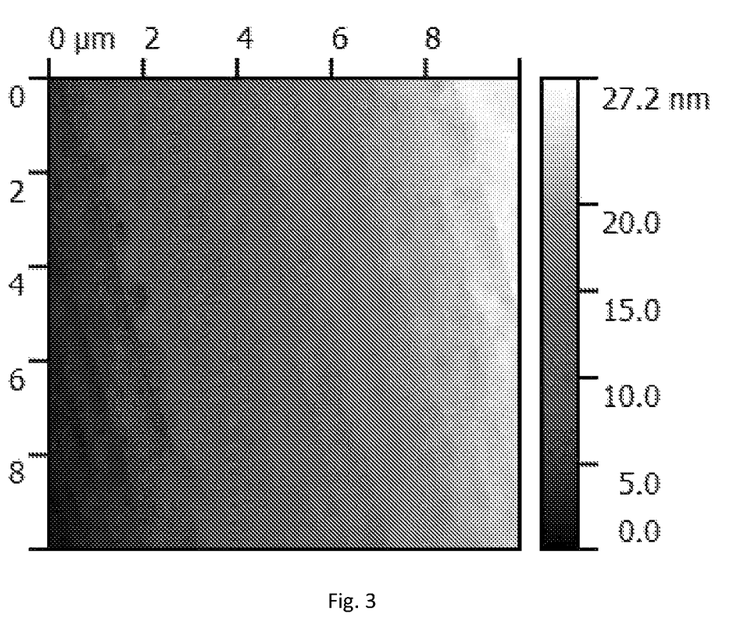
FIG. 3 is an image of the SiC surface with a graphene layer for a cooling speed of 0.45 K/s.

The preparation of graphene on the SiC surface is carried out according to example 1, with the difference that the graphitization step is carried out at the temperature of 1600K, while the second and third beam of silicon atoms (the beam used during graphitization and during cooling) is $7.0 \times 10^{13}$ $cm^2s^{-1}$. The surface image of the sample thus obtained is shown in FIG. 3.

EXAMPLE 4

Preparation of Graphene on a SiC Surface with a Cooling Rate of 0.23 K/s (Sample 4)

Figure 4:
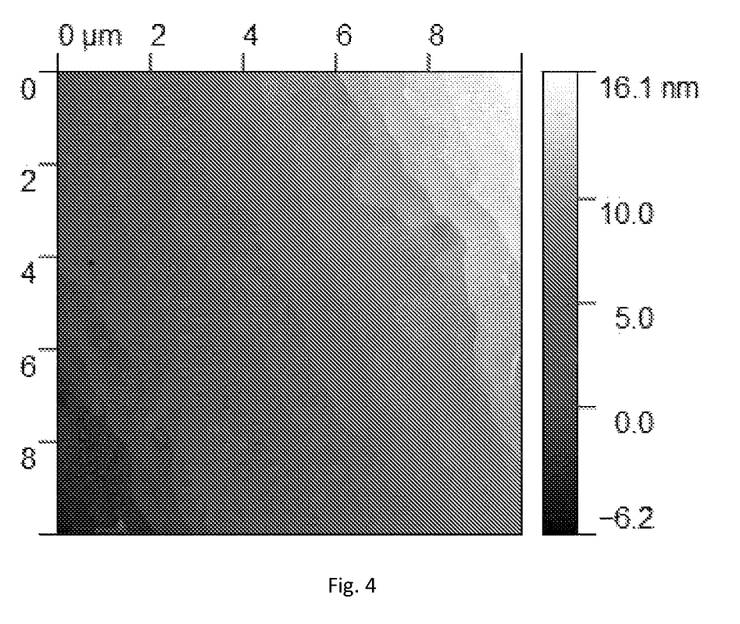
FIG. 4 is an image of a SiC surface with a graphene layer for a cooling speed of 0.23 K/s.

The preparation of graphene on the SiC surface is carried out according to example 1, with the difference that the graphitization step is carried out at the temperature of 1975K, and after completion of the graphitization step, the sample is cooled down at a rate of 0.23 K/s. The surface image of the sample thus obtained is shown in FIG. 4.

EXAMPLE 5

Preparation of Graphene on a SiC Surface with a Cooling Rate of 1.43 K/s (Sample 5)

Figure 5:
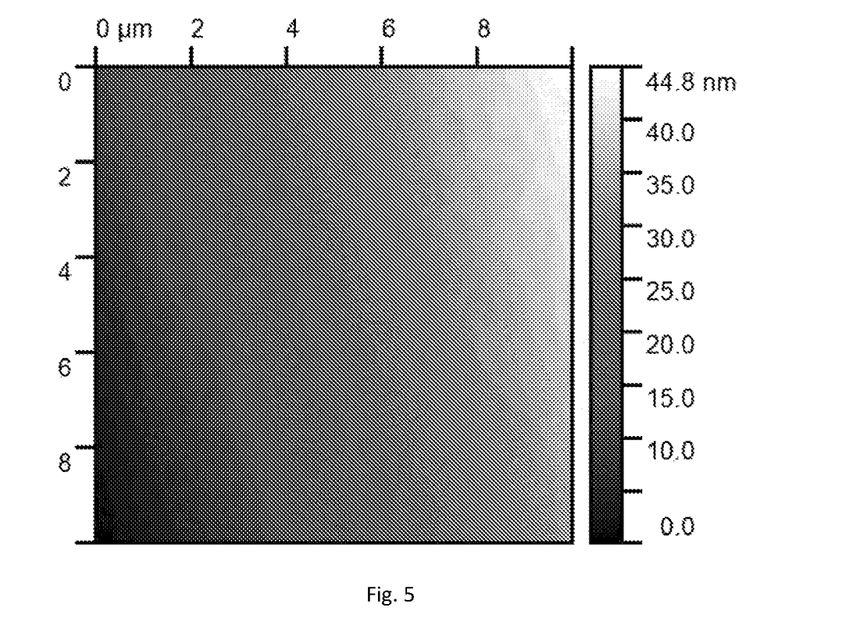
FIG. 5 is an image of a SiC surface with a graphene layer for a cooling speed of 1.43 K/s.

The preparation of graphene on the SiC surface is carried out according to example 1, with the difference that the graphitization step is carried out at the temperature of 1831K, and after completion of the graphitization step, the sample is cooled down at a rate of 1.43 K/s. The surface image of the sample thus obtained is shown in FIG. 5.

EXAMPLE 6

Preparation of Graphene on a SiC Surface with a Cooling Rate of 100 K/s (Sample 6)

Figure 6A:
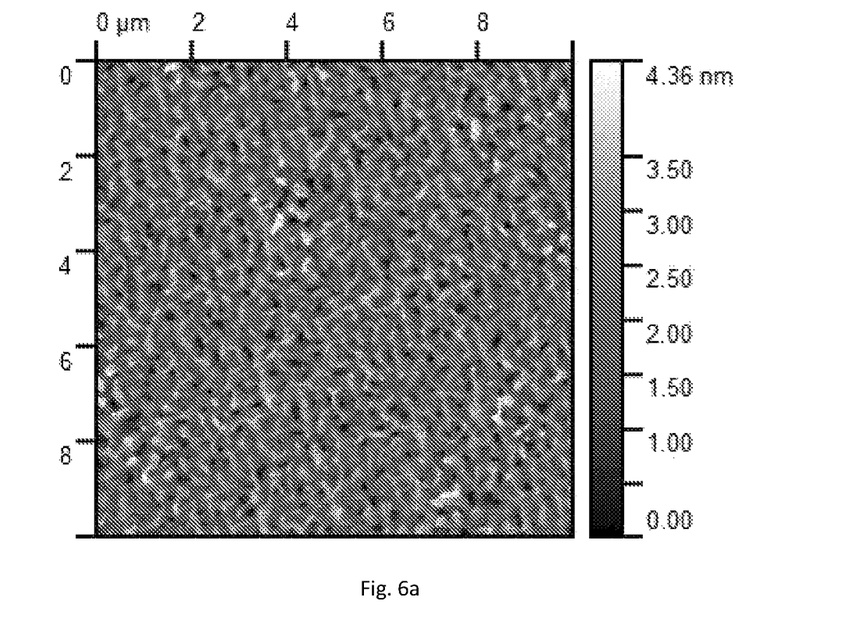
FIG. 6 is an image of the SiC surface with a graphene layer for a cooling speed of 100 K/s.
Figure 6B:
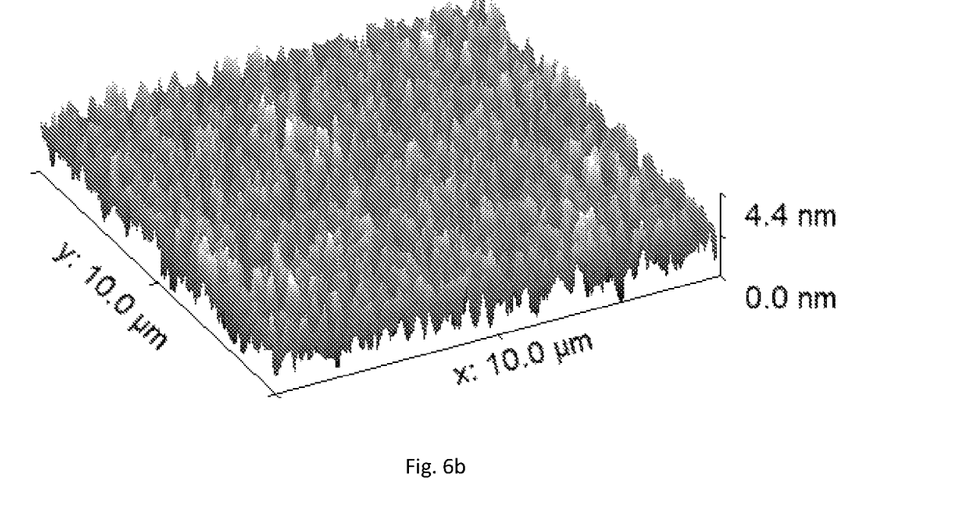

The preparation of graphene on the SiC surface is carried out according to example 1, with the difference that the graphitization step is carried out at the temperature of 1975K, and after completion of the graphitization step, the sample is cooled down at a rate of 100 K/s. The surface image of the sample thus obtained is shown in FIG. 6a. The sample is characterized by the presence of numerous pits on the surface, which is especially visible in three-dimensional images (FIG. 6b).

EXAMPLE 7

The Preparation of Graphene on a SiC Surface with a Cooling Rate of 100 K/s (Sample 7)

Figure 7A:
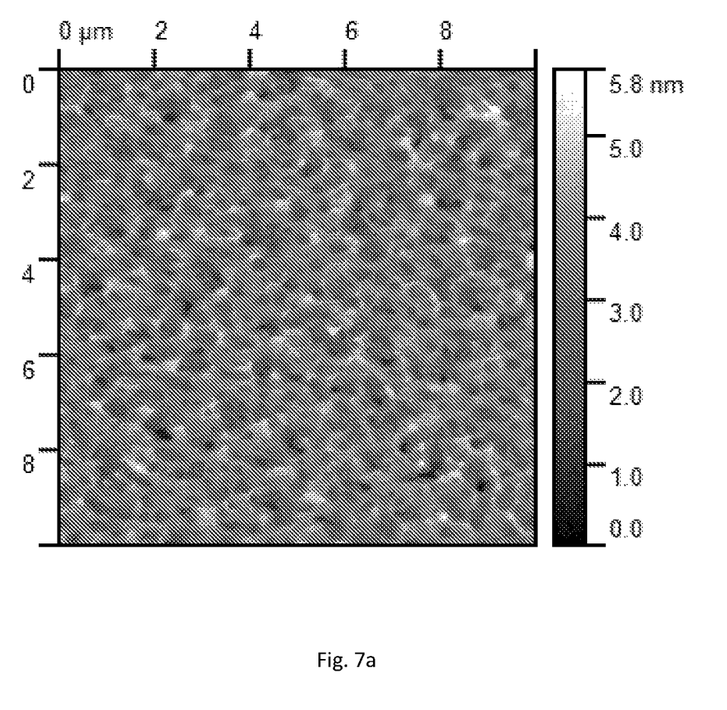
FIG. 7 is an image of a SiC surface with a graphene layer for a cooling speed of 100 K/s and a graphitization temperature of 1549 K.
Figure 7B:
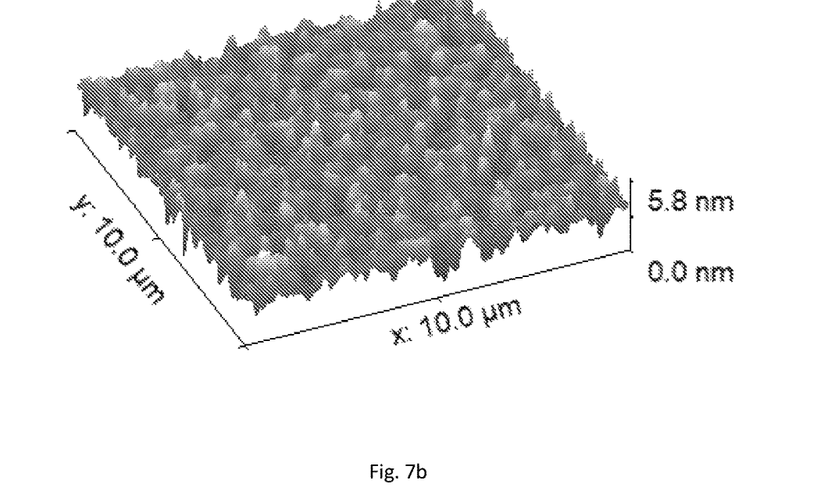

The preparation of graphene on the SiC surface is carried out according to example 1, with the difference that the graphitization step is carried out at the temperature of 1549K, and after completion of the graphitization step, the sample is cooled at a rate of 100 K/s in a beam of silicon atoms of $5.0 \times 10^{13}$ $cm^2s^{-1}$. The surface image of the sample thus obtained is shown in FIG. 7a. The sample is characterized by the presence of numerous pits on the surface, which is especially visible in three-dimensional images (FIG. 7b).

EXAMPLE 8

Comparison with Commercial Samples (Sample 8 and 9, Comparative Example)

Figure 12:
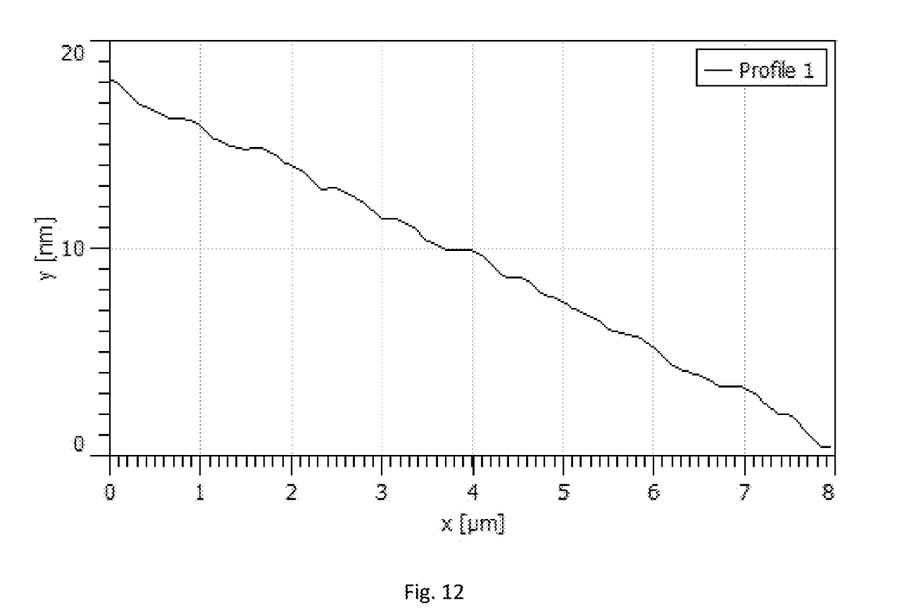
FIG. 12-14 are a comparison of surface profile of the samples shown in FIG. 4 and FIG. 15 and FIG. 16, respectively.
Figure 13:
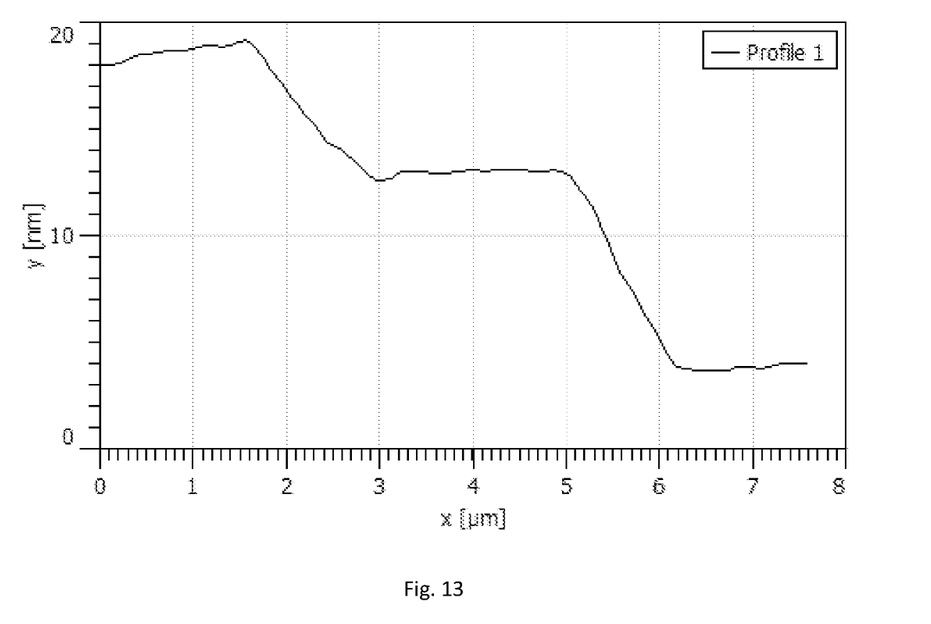
Figure 14:
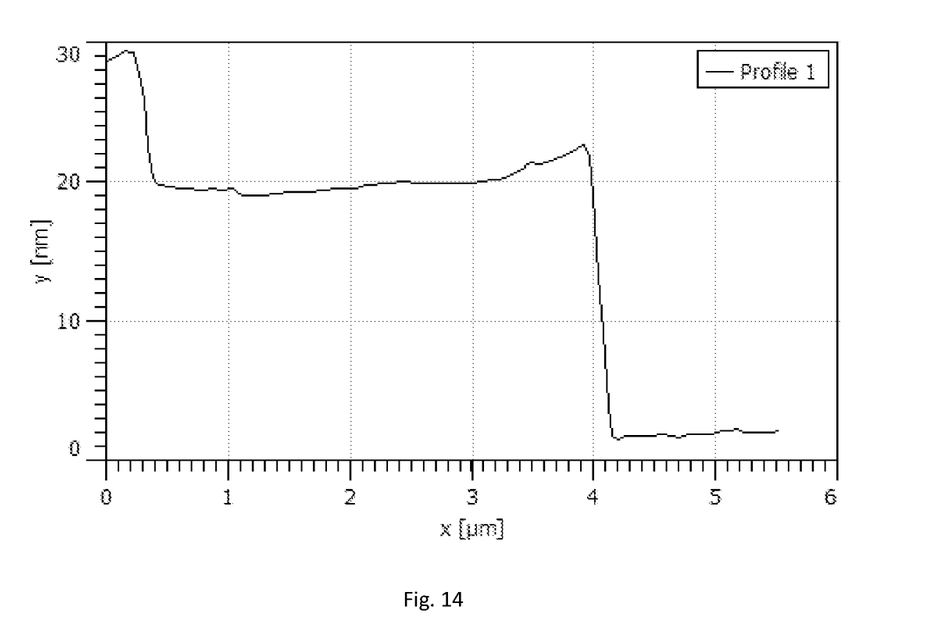
Figure 15:
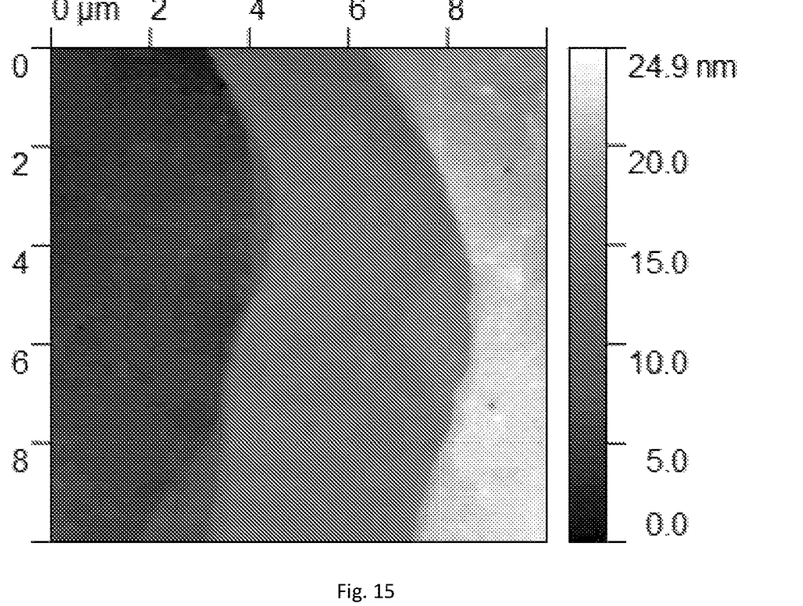
Figure 16:
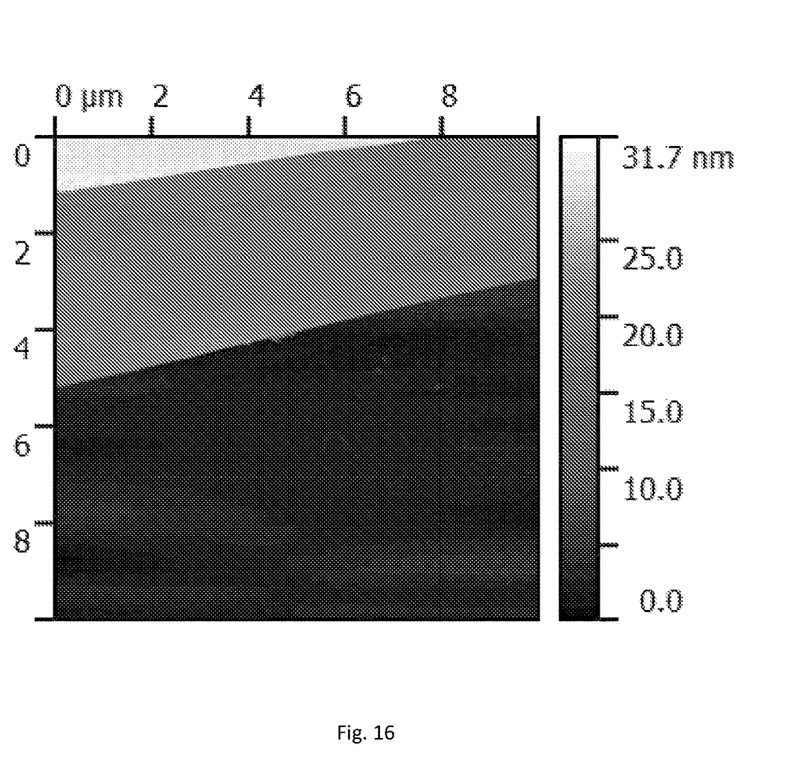

FIGS. 13 and 15 (Sample 5), and FIGS. 14 and 16 (Sample 6) show surface cross sections of commercial graphene samples on a SiC surface taken with an atomic force microscope. In both cases, high terraces are clearly visible, which is additionally visible in FIGS. 13-14. The comparison with the profile of sample 4 (FIG. 4 and FIG. 12), obtained according to the invention, clearly shows that the terraces are much lower in relation to the graphene obtained with the methods used so far.

The samples of commercially available graphene on SiC differ significantly from graphene produced by means of annealing in a beam of silicon and very slow cooling. The most important characteristic of commercial graphene is the presence of very high terraces on the surface—with a height of approx. 10 nm for sample 5 and approx. 15 nm for sample 6. In the case of graphene produced with the use of slow cooling (sample 4), there are only narrow and low terraces on the surface, the surface is therefore very flat.

EXAMPLE 9

Preparation of Graphene on a SiC Surface with a Cooling Rate of 0.3 K/s, without a Beam of Silicon (Comparative Example)

Figure 10:
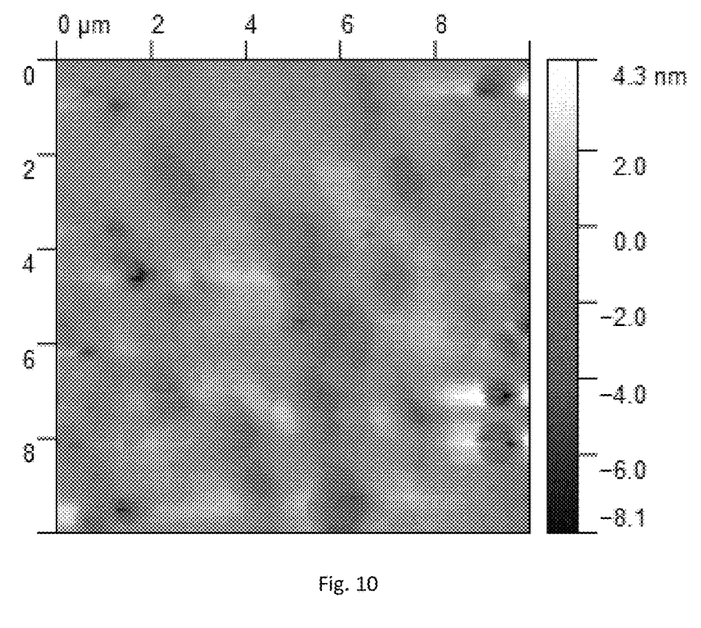
FIG. 10 is a graphene on SiC surface obtained with a cooling rate of 0.3 K/s without silicon beam.

The preparation of graphene on the SiC surface is carried out according to example 2, with the difference that the sample is cooled without the presence of a beam of silicon. The surface image of the sample thus obtained is shown in FIG. 10. The image shows that the surface prepared in this way is disordered, the structure of the terraces is disturbed, and defects and pits appear on the surface. This shows that to obtain a surface with an almost perfectly flat morphology, covered only with low terraces, it is necessary, in addition to the slow cooling rate of the sample, to place it in the beam of silicon atoms during cooling.

EXAMPLE 10

Determination of the Surface Density of Pits and the Depth of Pits

Figure 11:
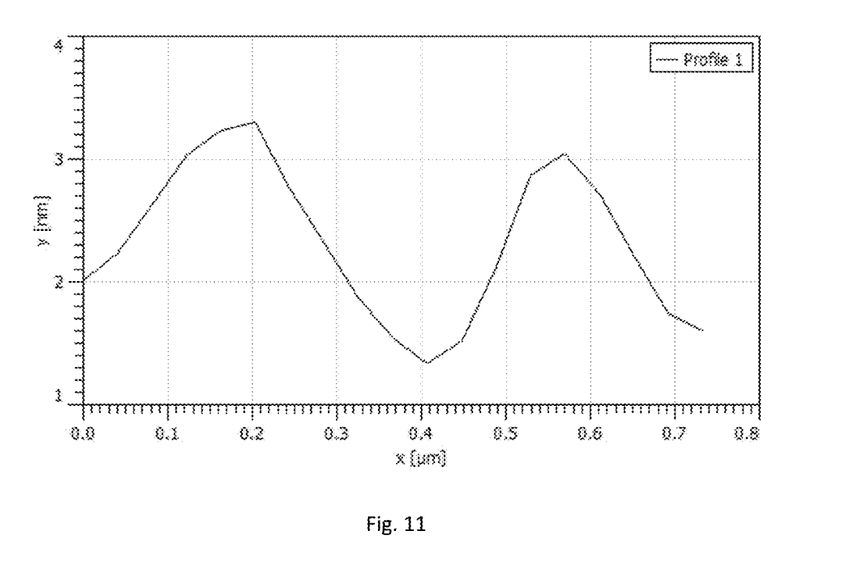
FIG. 11 is an exemplary pit profile.

The depth of pits was determined on the basis of the AFM studies. An exemplary profile of the pit (sample 6, part of the image of example 6) is shown in FIG. 11. The depth of the pit is 2 nm=$2\times10^{-9}$ m. The maximum depth of pits for samples annealed at high cooling rate is $3.5\times10^{-9}$ m. The surface density of the pits was determined by counting them in the AFM images. The pit is understood as the difference in height determined by the image recognition algorithm from the obtained images of the surface of the samples using the AFM method.

EXAMPLE 11

Preparation of Graphene on a SiC Surface with a Cooling Rate of 0.45 K/s (Sample 10)

Figure 17:
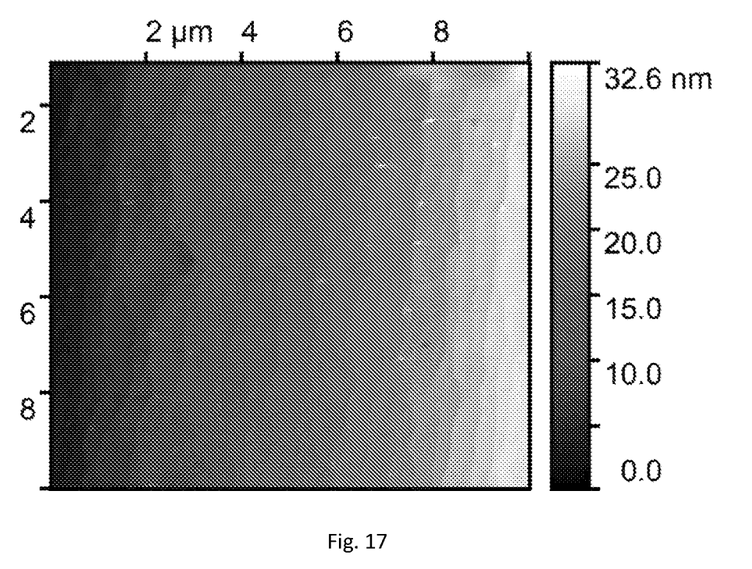
FIG. 17 is an image of the SiC surface with a graphene layer for a cooling rate of 0.45 K/s and a process temperature of 2090K.

The preparation of graphene on the SiC surface is carried out according to example 1, with the difference that the graphitization step is carried out at a temperature of 2090K, the first and second beam of silicon atoms are equal to $2.5\times10^{14}$ cm$^2$s$^{-1}$, and after the graphitization step is completed, the sample is cooled down at the speed of 0.45 K/s. The surface image of the sample thus obtained is shown in FIG. 17.

EXAMPLE 12

Preparation of Graphene on a SiC Surface with a Cooling Rate of 100 K/s (Sample 11)

Figure 18A:
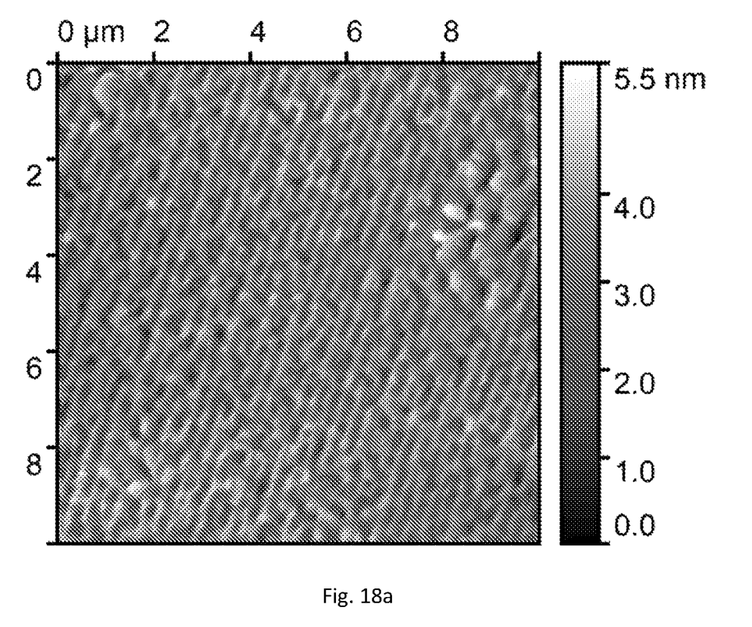
FIG. 18a is an image of the sample surface obtained at the cooling rate 100 K/s and the value of the beam of silicon atoms of $2.5 \times 10^{14}$ cm$^2$s$^{-1}$.
Figure 18B:
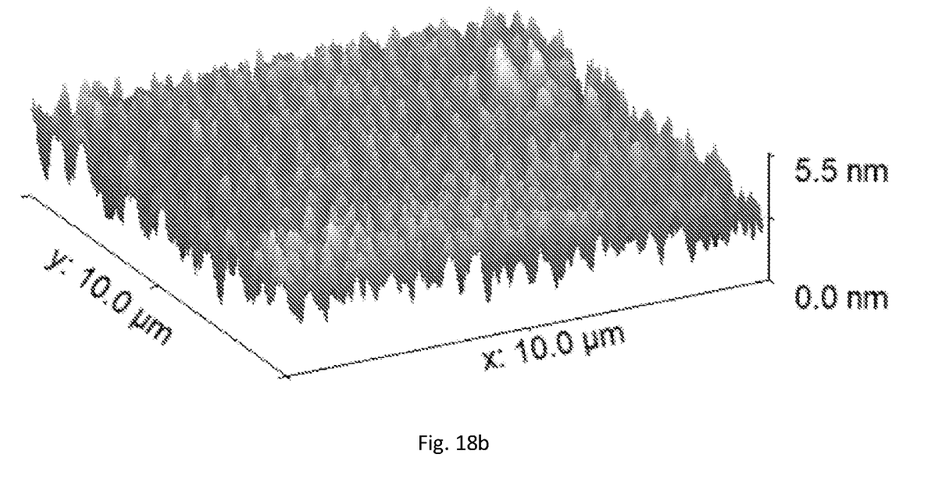
FIG. 18b is a three-dimensional image of the surface of the sample according to example 12.

The preparation of graphene on the SiC surface is carried out according to example 1, with the difference that the graphitization step is carried out at a temperature of 1670K, and after the graphitization step is completed, the sample is cooled at the rate of 100 K/s in a beam of silicon atoms of $2.5\times10^{14}$ cm$^2$s$^{-1}$. The surface image of the sample thus obtained is shown in FIG. 18a. The sample is characterized by the presence of numerous pits on the surface, which is especially visible in three-dimensional images (FIG. 18b).

The invention claimed is:

1. A method of obtaining a silicon carbide (SiC) graphene surface composite with a controlled surface morphology, comprising the steps of:
   (a) providing a silicon carbide (SiC) substrate,
   (b) annealing the SiC substrate at a temperature of 1573 K to 2090 K, at a pressure of not more than $5\times10^{-7}$ mbar, in a first beam of silicon atoms from an external source of silicon atoms,
   (c) cooling,
   wherein in step (c) the SiC substrate from step b) is cooled at a rate of 0.23 K/s to 1.43 K/s, in a second beam of silicon atoms from the external source of silicon atoms, to obtain a surface covered with terraces, or cooled at a rate of >100 K/s in a third beam of silicon atoms from the external source of silicon atoms, to obtain a surface covered with a network of pits.

2. The method according to claim 1, characterized in that the second beam of silicon atoms from the external source of silicon atoms during cooling ranges from $7.0\times10^{13}$ cm$^2$s$^{-1}$ to $2.5\times10^{14}$ cm$^2$s$^{-1}$.

3. The method according to claim 1, characterized in that the first beam of silicon atoms from the external source of silicon atoms during the annealing ranges from $7.0\times10^{13}$ cm$^2$s$^{-1}$ to $2.5\times10^{14}$ cm$^2$s$^{-1}$.

4. The method according to claim 1, characterized in that the third beam of silicon atoms from the external source of silicon atoms during cooling ranges from $5.0\times10^{13}$ cm$^2$s$^{-1}$ to $2.5\times10^{14}$ cm$^2$s$^{-1}$.

5. The method according to claim 1, characterized in that the external source of silicon atoms is a sublimation source.

6. The method of claim 1, wherein the SiC substrate has a crystalline structure.

7. The method of claim 1, wherein the SiC substrate has a polycrystalline structure.

* * * * *